(12) United States Patent
Maric et al.

(10) Patent No.: US 11,822,145 B2
(45) Date of Patent: Nov. 21, 2023

(54) LENS MOUNTING SYSTEMS FOR ELECTRONIC DEVICES

(71) Applicant: Apple Inc., Cupertino, CA (US)

(72) Inventors: Ivan S. Maric, Sunnyvale, CA (US); Aidan N. Zimmerman, Sunnyvale, CA (US); Forrest C Wang, Petaluma, CA (US); Jan K. Quijalvo, Santa Clara, CA (US); Kuldeep P. Lonkar, San Jose, CA (US); Nathan Morris, Cottage Grove, MN (US); Todd R. Farr, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 357 days.

(21) Appl. No.: 16/933,870

(22) Filed: Jul. 20, 2020

(65) Prior Publication Data
US 2021/0080680 A1 Mar. 18, 2021

Related U.S. Application Data

(60) Provisional application No. 62/899,335, filed on Sep. 12, 2019.

(51) Int. Cl.
*G02B 7/02* (2021.01)
*G02B 27/00* (2006.01)
(Continued)

(52) U.S. Cl.
CPC ............ *G02B 7/025* (2013.01); *G02B 5/285* (2013.01); *G02B 7/002* (2013.01);
(Continued)

(58) Field of Classification Search
CPC ........ G02B 7/025; G02B 7/002; G02B 5/285; G02B 27/0093
(Continued)

(56) References Cited

U.S. PATENT DOCUMENTS 6,307,818 B1 10/2001 Jerman et al.
6,771,423 B2 8/2004 Geist
(Continued)

FOREIGN PATENT DOCUMENTS

CN 104950416 A * 9/2015
CN 104950416 A 9/2015
(Continued)

OTHER PUBLICATIONS

Specifying Anodized Finishes on Aluminum. Aluminum Anodizers Council. Feb. 2013 (Year: 2013).*
(Continued)

*Primary Examiner* — Collin X Beatty
(74) *Attorney, Agent, or Firm* — Treyz Law Group, P.C.; G. Victor Treyz; David K. Cole (57) ABSTRACT

An electronic device such as a head mounted device may have a display that displays an image for a user. Head-mounted support structures may be used to support the display and to support lenses. The head-mounted support structures may have one or more lens barrels or other support members. Each lens may have an optical surface and a side surface. Adhesive may be used to attach the lenses to the head-mounted support structures. A first portion of the adhesive may bond each lens to a first respective portion of a support member and a second portion of the adhesive may bond each lens to a second respective portion of the support member. The adhesive may be a non-silicone adhesive that fractures in bulk rather than failing at interfaces with the lens and support member. The elastic modulus of the adhesive may help avoid cracking and plastic deformation during drop events.

19 Claims, 5 Drawing Sheets

(51) Int. Cl.
*G02B 5/28* (2006.01)
*G02B 7/00* (2021.01)
*G02B 27/01* (2006.01)

(52) U.S. Cl.
CPC ..... *G02B 27/0093* (2013.01); *G02B 27/0172* (2013.01); *G02B 27/0176* (2013.01); *G02B 2027/0138* (2013.01)

(58) Field of Classification Search
USPC ........................................................ 359/581
See application file for complete search history.

(56) References Cited

U.S. PATENT DOCUMENTS

| | | | |
|---|---|---|---|
| 7,244,069 B2 | 7/2007 | Nakanishi et al. | |
| 7,283,313 B2 | 10/2007 | Tamaoki et al. | |
| 7,379,113 B2 | 5/2008 | Kong et al. | |
| 8,542,451 B2 | 9/2013 | Lu et al. | |
| 2011/0187987 A1* | 8/2011 | Zider | G02C 13/00 351/110 |
| 2014/0028966 A1* | 1/2014 | Blum | G02C 11/10 351/153 |
| 2018/0024368 A1 | 1/2018 | Takagi et al. | |
| 2018/0188472 A1 | 7/2018 | Deng et al. | |
| 2020/0271957 A1* | 8/2020 | Jamshidi | G02C 7/04 |

FOREIGN PATENT DOCUMENTS

| | | | | |
|---|---|---|---|---|
| CN | 105705978 A | | 6/2016 | |
| CN | 108727999 A | | 11/2018 | |
| CN | 109143523 A | | 1/2019 | |
| CN | 209311784 U | * | 8/2019 | ............ G02B 27/01 |
| CN | 209311784 U | | 8/2019 | |
| JP | 10935312 A | | 2/1997 | |
| JP | 2011099902 A | | 5/2011 | |
| KR | 19990069147 A | | 9/1999 | |
| TW | 201823786 A | | 7/2018 | |

OTHER PUBLICATIONS

Bernie Outram. Black Coatings to Reduce Stray Light. University of Arizona 2016. Archived online Apr. 12, 2019 at https://web.archive.org/web/20190412075804/https://wp.optics.arizona.edu/optomech/wp-content/uploads/sites/53/2016/10/Black-Coatings-to-Reduce-Stray-Light.pdf (Year: 2016).*

* cited by examiner

LENS MOUNTING SYSTEMS FOR ELECTRONIC DEVICES

This application claims the benefit of provisional patent application No. 62/899,335, filed Sep. 12, 2019, which is hereby incorporated by reference herein in its entirety.

BACKGROUND

This relates generally to electronic devices and, more particularly, to electronic devices with optical components.

Electronic devices sometimes include optical components. For example, a wearable electronic device such as a head-mounted device may include a display for displaying an image.

Lenses may be used to allow a user of a head-mounted device to focus on a display and view the image. Lens support structures may be provided to support the lenses.

Challenges can arise in supporting lenses in an electronic device. If care is not taken, lens support structures will be insufficiently robust. This can give rise to a risk that lenses will become detached from the lens support structures during a drop event.

SUMMARY

An electronic device such as a head mounted device may have a display that displays an image for a user. The device may have a pair of lenses. A user may view images on the display from eye boxes. Each lens may allow a user to view the display from an eye located in a respective eye box.

Head-mounted support structures may be used to support the display and lenses. The head-mounted support structures may have one or more lens support members formed from aluminum or other materials. Each lens may have an optical surface and a side surface. Adhesive may be used to attach the lenses to the lens support members. A first portion of the adhesive may bond a lens to a first respective portion of a support member and a second portion of the adhesive may bond the lens to a second respective portion of the support member.

The adhesive may be a non-silicone adhesive that fractures in bulk rather than failing at interfaces with the lens and support member. The elastic modulus of the adhesive may have a value that helps avoid undesired failure modes during drop events.

DETAILED DESCRIPTION

Electronic devices may include displays and other components for presenting content to users. The electronic devices may be wearable electronic devices. A wearable electronic device such as a head-mounted device may have head-mounted support structures that allow the head-mounted device to be worn on a user's head.

A head-mounted device may contain optical components such as a display for displaying visual content and lenses for allowing the user to view the visual content on the display. The head-mounted support structures may support the display and lenses.

Figure 1:
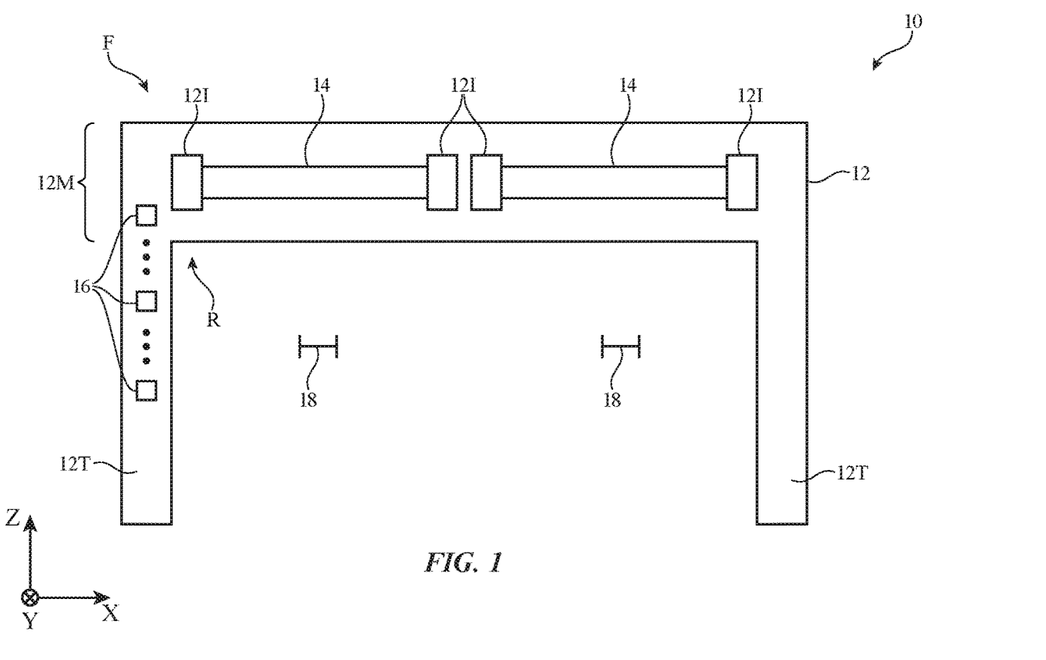
FIG. 1 is a top view of an illustrative electronic device such as a head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portion (e.g., support structures 12T) to allow device 10 to be worn on a user's head. A main housing portion (e.g., support structure 12M) and associated internal housing portion (e.g., internal support structures 12I) may support the display, lenses, and other optical components 14 (e.g., structures 12I may serve as lens support structures).

Front face F of housing 12 may face outwardly away from a user's head. Rear face R of housing 12 may face the user. During operation, a user's eyes are placed in eye boxes 18. When the user's eyes are located in eye boxes 18, the user may view content being displayed by optical components 14. In some configurations, optical components 14 are configured to display computer-generated content that is overlaid over real-world images (e.g., a user may view the real world through components 14). In other configurations, which are sometimes described herein as an example, real-world light is blocked (e.g., by an opaque housing wall on front face F of housing 12 and/or other portions of device 10).

The support structures of device 10 may include adjustable components. For example, support structures 12T and 12M of housing 12 may include adjustable straps or other structures that may be adjusted to accommodate different head sizes. Support structures 12I may include motor-driven adjustable lens mounts, manually adjustable lens mounts, and other adjustable optical component support structures. Structures 12I may be adjusted by a user to adjust the locations of eye boxes 18 to accommodate different user interpupillary distances. For example, in a first configuration, structures 12I may place lenses and other optical components associated respectively with the user's left and right eyes in close proximity to each other so that eye boxes 18 are separated from each other by a first distance and, in a second configuration, structures 12I may be adjusted to place the lenses and other optical components associated with eye boxes 18 in a position in which eye boxes are separated from each other by a second distance that is larger than this distance.

In addition to optical components 14, device 10 may contain other electrical components 16. Components 14 and/or 16 may include integrated circuits, discrete components, printed circuits, and other electrical circuitry. For example, these components may include control circuitry and input-output devices.

The control circuitry of device 10 may include storage and processing circuitry for controlling the operation of device 10. The control circuitry may include storage such as hard disk drive storage, nonvolatile memory (e.g., electrically-programmable-read-only memory configured to form a solid-state drive), volatile memory (e.g., static or dynamic random-access-memory), etc. Processing circuitry in the control circuitry may be based on one or more microprocessors, microcontrollers, digital signal processors, baseband processors, power management units, audio chips, graphics processing units, application specific integrated circuits, and other integrated circuits. Software code may be stored on storage in the control circuitry and run on processing circuitry in the control circuitry to implement control operations for device 10 (e.g., data gathering operations, operations involving the adjustment of the components of device 10 using control signals, etc.). Control circuitry in device 10 may include wired and wireless communications circuitry. For example, the control circuitry may include radio-frequency transceiver circuitry such as cellular telephone transceiver circuitry, wireless local area network (WiFi®) transceiver circuitry, millimeter wave transceiver circuitry, and/or other wireless communications circuitry.

Device 10 may be used in a system of multiple electronic devices. During operation, the communications circuitry of device 10 may be used to support communication between device 10 and other electronic devices in the system. For example, one electronic device may transmit video and/or audio data to device 10 or another electronic device in the system. Electronic devices in the system may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

The input-output devices of device 10 (e.g., input-output devices in components 16) may be used to allow a user to provide device 10 with user input. Input-output devices may also be used to gather information on the environment in which device 10 is operating. Output components in the input-output devices may allow device 10 to provide a user with output and may be used to communicate with external electrical equipment.

The input-output devices of device 10 may include one or more displays. In some configurations, a display in device 10 may include left and right display devices (e.g., left and right components such as left and right scanning mirror display devices, liquid-crystal-on-silicon display devices, digital mirror devices, or other reflective display devices, left and right display panels based on light-emitting diode pixel arrays such as organic light-emitting display panels or display devices based on pixel arrays formed from crystalline semiconductor light-emitting diode dies, liquid crystal display devices panels, and/or or other left and right display devices in alignment with the user's left and right eyes, respectively). In other configurations, the display includes a single display panel that extends across both eyes or uses other arrangements in which content is provided with a single pixel array.

The display of device 10 is used to display visual content for a user of device 10. The content that is presented on the display may include virtual objects and other content that is provided to the display by control circuitry 12 and may sometimes be referred to as computer-generated content. An image on the display such as an image with computer-generated content may be displayed in the absence of real-world content or may be combined with real-world content. In some configurations, a real-world image may be captured by a camera (e.g., a forward-facing camera) so that computer-generated content may be electronically overlaid on portions of the real-world image (e.g., when device 10 is a pair of virtual reality goggles with an opaque display).

The input-output circuitry of device 10 may include sensors. The sensors may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source such as an infrared light source that emits one or more beams of light that are tracked using the image sensor after reflecting from a user's eyes), touch sensors, buttons, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, light sensors that make user measurements, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in the input-output devices of device 10. If desired, device 10 may include haptic output devices (e.g., vibrating components), light-emitting diodes and other light sources, speakers such as ear speakers for producing audio output, and other electrical components used for input and output. If desired, device 10 may include circuits for receiving wireless power, circuits for transmitting power wirelessly to other devices, batteries and other energy storage devices (e.g., capacitors), joysticks, buttons, and/or other components.

Some or all of housing 12 may serve as support structures (see, e.g., the portion of housing 12 formed by support structures 12T and the portion of housing 12 formed from support structures 12M and 12I). In configurations in which electronic device 10 is a head-mounted device (e.g., a pair of glasses, goggles, a helmet, a hat, etc.), structures 12T and 12M and/or other portions of housing 12 may serve as head-mounted support structures (e.g., structures forming a helmet housing, head straps, temples in a pair of eyeglasses, goggle housing structures, and/or other head-mounted structures). The head-mounted support structures may be configured to be worn on a head of a user during operation of device 10 and may support display(s), lenses, sensors, other input-output devices, control circuitry, and/or other components.

Figure 2:
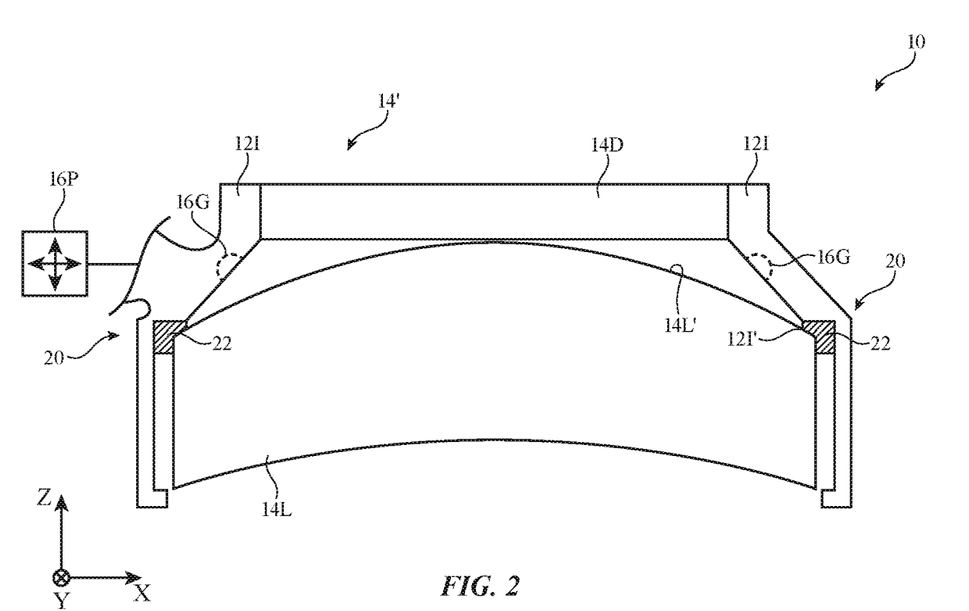
FIG. 2 is a cross-sectional view of an illustrative head-mounted device support structure for supporting a display panel and lens in accordance with an embodiment.

FIG. 2 is a top cross-sectional view of a portion of electronic device 10 in an illustrative configuration in which electronic device 10 is a head-mounted device. As shown in FIG. 2, electronic device 10 may include support structures such as support structure 12I to support optical components 14 such as display panel 14D and lens 14L. Structure 12I may sometimes be referred to as a lens support structure, a lens barrel, a display support structure, and/or a display and lens support structure. Each of the lenses in device 10 such as lens 14L of FIG. 2 may be held in place on a respective support structure 12I using a ring of adhesive. The adhesive may be received within a ring-shaped channel in support structure 12I. The adhesive may be bonded between inner surface 12I' of support structure 12I and opposing surfaces of lens 14L (e.g., optical surface 14L' of lens 14L and the non-optical peripheral edge of lens 14L, sometimes referred to as a lens side surface). Optical surface 14L' is polished and passes light from the display of device 10 to the eye boxes from which the display is viewed. The non-optical peripheral edge surface does not pass image light to the eye boxes and need not be polished.

If desired, components 16 (e.g., components 16G) may be supported by support structure 12I. Components 16G may be, for example, gaze tracking sensors that gather user eye location information through lens 14L. Gaze tracking system components such as components 16G may emit and detect infrared light (e.g., near infrared light). Optional lens positioners such as electrically adjustable lens positioner 16P may be used to adjust the location of support structure 14I (and therefore the location of display panel 14D and lens 14L). Positioner 16P may be an electromagnetic actuator, a geared motor, a stepper motor, a piezoelectric actuator, and/or other system for positioning support structure 12I in desired dimensions (e.g., desired locations along the X, Y, and/or Z axes of FIG. 2).

Figure 3:
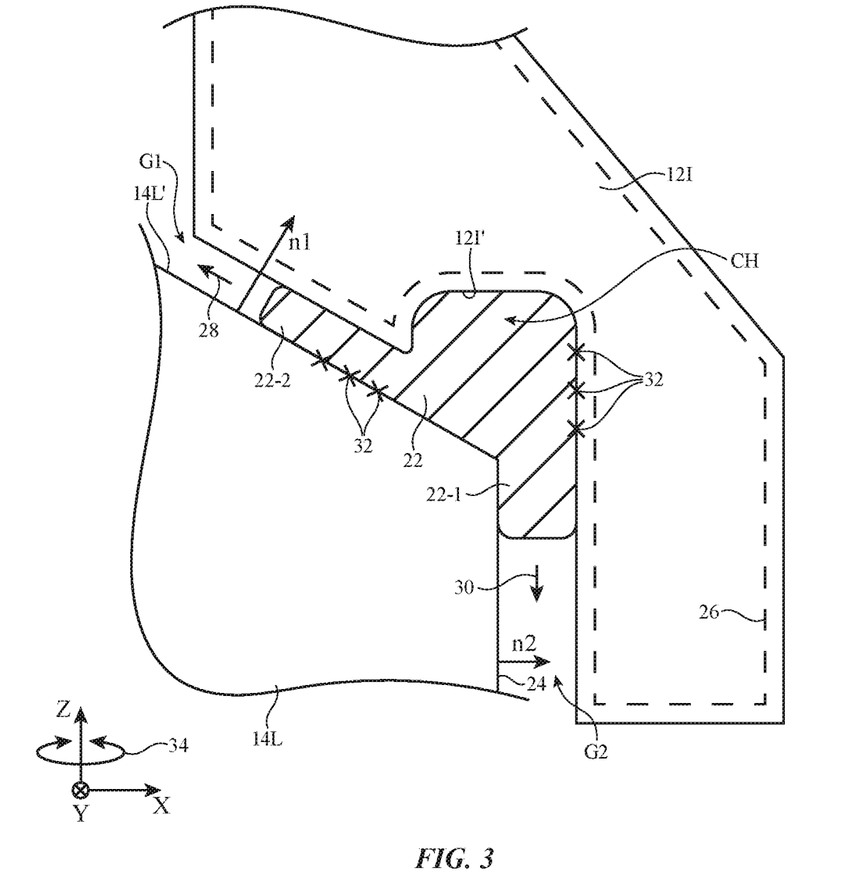
FIG. 3 is a cross-sectional view of a portion of a lens and support structure in accordance with an embodiment.

Portions of support structure 12I may cover the side surfaces of lens 14L (e.g., to help block stray light). As shown in FIG. 3, adhesive 22 may partly adhere to portions of these side surfaces (see, e.g., lens side surface 24) and to portions of optical lens surface 14L' on the front face of lens 14L facing display panel 14D. Channel CH in support structure 12I may receive adhesive 22.

The shape of lens 14L may be rotationally asymmetric. As a result, the location of surface 12L' adjacent to adhesive 22 may vary along dimension Z as a function of rotational position about the Z axis of FIG. 3 (e.g., the Z location f channel CH) may vary as a function of rotation in direction 34 about the Z axis. Channel CH may be formed, for example, using a three-axis milling machine (or other machining tool) with a milling bit that extends parallel to the Z axis (as an example). During the process of machining channel CH in support structure 12I, the milling machine moves the milling bit about axis Z (e.g., in a ring). At the same time, the milling machine dynamically adjusts the Z position of the milling bit to follow the asymmetric lens surface shape established by lens surface 14L'. The use of a three-axis computer-controlled machining tool to form channel CH is illustrative. Configurations in which channel CH is machined using a five-axis milling machine or other equipment may be used, if desired.

Support structure 12I may be formed from aluminum, other metal(s), polymer, ceramic, fiber-composite materials such as carbon fiber materials in which fibers are joined using a polymer binder, and/or other materials. Adhesive, fasteners, and/or other structures may be used in coupling portions of structure 12I together. Arrangements in which structure 12I includes molded structures and/or structures formed using other fabrication techniques may be used, if desired.

During assembly of device 10, a computer-controlled needle dispenser or other adhesive dispensing tool may dispense a bead of adhesive 22 in channel CH. The bead of adhesive may form an adhesive ring that runs along the peripheral edge of lens 14L. Heat curing, chemical curing, light-based curing, and/or other adhesive curing techniques may be used to cure adhesive 22 after lens 14L is in its desired final position.

During the process of pressing lens 14L against adhesive 22 in the Z direction (prior to curing), adhesive 22 spreads in direction 28 into gap G1 between lens optical surface 14L' and support structure 12I and spreads in direction 30 into gap G2 between lens side surface 24 (e.g., a non-optical side surface). The relative sizes of gaps G1 and G2 may be configured to control adhesive flow.

There is a risk that excess adhesive flow along direction 28 will obstruct light rays passing between the display and the eye box. Accordingly, adhesive flow in direction 28 can be limited by ensuring that the size of gap G2 is greater than the size of gap G1. In an illustrative configuration, gap G2 (which may be, for example, 500 microns or other suitable size) is about twice as large as gap G1 (which may be, for example, 250 microns or other suitable size). When gap G2 is larger than gap G1 in this way, portion 22-1 of adhesive 22 tends to flow more in direction 30 than portion 22-2 of adhesive 22 flows in direction 28, thereby ensuring that excess adhesive will not form on optical lens surface 14L'.

The adhesive material that is used to form adhesive 22 may be organic (e.g., non-silicone adhesive). For example, adhesive 22 may be epoxy, urethane, silane-modified polymer, or other non-silicone adhesive (as examples). The use of non-silicone adhesive may help avoid situations in which uncured liquid silicone adhesive might be present on the face of lens 14L and (due to its differing index of refraction from that of lens 14L) might distort light passing through lens 14L.

Adhesive 22 may exhibit an elasticity that is not too rigid (and therefore too brittle and subject to premature cracking in the event of a drop event) and not to soft (and therefore subject to plastic deformation in the event of a drop event which could lead to permanent lens misalignment). With an illustrative configuration, adhesive 22 has a Young's modulus of elasticity of 0.1 to 1000 MPa, 1-100 MPa, 1-200 MPa, 1-500 MPa, at least 1 MPa, at least 10 MPa, less than 600 MPa, less than 300 MPa, etc. An adhesive with an elasticity of about 1 MP may sometimes be referred to as a nonstructural adhesive. An adhesive with a modulus of about 100 MPa may sometimes be referred to as a semistructural adhesive. An adhesive with a modulus of greater than 300 MPa may sometimes be referred to as a structural adhesive. A suitable adhesive for use as adhesive 22 (e.g., an adhesive with an elasticity in one of these illustrative ranges such as an adhesive with a 100 MPa elasticity) will tend to be sufficiently flexible to resist cracking during a drop event while being sufficiently rigid to resist plastic deformation during a drop event.

The presence of adhesive 22 in gaps G1 and G2 helps to form two adhesive bonds. The first adhesive bond is present in gap G1 and tends to resist tensile forces parallel to surface normal n1 of lens surface 14L'. The second adhesive bond is present in gap G2 and tends to resist tensile forces parallel to surface normal n2 of the non-optical surface of lens 14L (lens side surface 24). Surface normals n1 and n2 are not parallel to each other (e.g., n1 and n2 are separated by an angle of at least 40°, at least 55°, 50-90°, and/or other suitable angle and, in some configurations, are nearly perpendicular to each other). During a drop event in which impact force is oriented along surface normal n1, the adhesive bond on surface 14L' will experience normal (tensile) force and the adhesive bond on surface 24 will experience shear force (force perpendicular to surface normal n2). Similarly, during a drop event in which impact force is oriented along surface normal n2, the adhesive bond on surface 24 will experience normal (tensile) force and the adhesive bond on surface 14L' will experience shear force (force perpendicular to surface normal n1). As a result, when one portion of the bond is presented with tensile force, another portion of the bond will be presented with shear force.

In this configuration, the adhesive bond between lens 14L and support structure 12I is sometimes referred to as including both a face-normal adhesive joint (surface 14L') and a radial adhesive joint (surface 24). The approximately orthogonal orientation of the optical lens surface on the front of lens 14L (surface 14L') and the non-optical surface on the side of lens 14L (side surface 24) causes the adhesive to exhibit both shear and tensile loads during a drop event in any orientation, thereby helping the adhesive bond to resist failure.

Adhesive 22 is configured to fracture in bulk. In the event of a failure, the adhesive surface bonding properties of adhesive 22 are generally sufficiently strong to cause the bulk of the adhesive to fail (e.g., to fracture in bulk) before the surface bonds fail (e.g., before the adhesive bond fails at an interface with lens 14L or support structure 12I). Optional coatings such as coatings 32 may be formed on support structure 12I (e.g., on inwardly facing surface 12I') and/or on the surfaces of lens 14L (e.g., on surface 14L' and/or surface 24). This coating may be, as an example, an adhesion promotion coating. Lens 14L may be formed from glass, crystalline material such as sapphire, polymer, and/or other transparent material. In an illustrative configuration, lens 14L is formed from acrylic and an adhesion promotion layer such as coating 32 (e.g., a primer coating such as a sol-gel coating or other adhesion promotor) may be used to enhance adhesive surface bonding strength.

To help suppress light reflections, support structure 12I may be provided with a light absorbing layer 26 on its surface (e.g., a visible-light and/or infrared-light absorbing coating). Support structure 12I may, as an example, include a lens support member such as an aluminum support member. Layer 26 may be formed from black anodized material such as an anodized layer of the aluminum material used to from the aluminum support member. Configurations in which layer 26 is formed from a layer of black organic material (e.g., a polymer containing dye and/or pigment such as a carbon black coating or other black ink coating), is formed from one or more deposited coating layers of other materials (e.g., one or more physical vapor deposition layers), or is formed from other light-absorbing materials may also be used. If desired, the light-absorbing coating on the support member of support structure 12I may be formed using electrophoretic deposition of black magnesium. The light-absorbing layer in an illustrative arrangement has magnesium, an anticorrosion coating on the magnesium, and a black layer of black paint or black magnesium on the anticorrosion coating. In general, any suitable black layer may be formed on support structure 12I (e.g., on surface 12I' of the aluminum support member or other support member in structure 12I). Layer 26 may be configured to absorb infrared light (e.g., near infrared light) emitted by a gaze tracking system (see, e.g., components 16G in FIG. 1).

Visible-light-absorbing and/or infrared-light-absorbing coating layers (sometimes referred to as edge-blackening) may also be formed on lens side surface 24 (e.g., polymer containing black dye and/or black pigment, and/or other opaque coating material) to help suppress stray light. In configurations in which edge-blackening is present, the radial adhesive bond is formed between adhesive portion 22-1 and the edge blackening. In configurations in which the acrylic or other material of lens 14L is coated with one or more coatings (e.g., a half-mirror coating), the front-face adhesive bond is formed between adhesive portion 22-2 and the half-mirror coating. Optional adhesion promotion coating material (e.g., coating 32) may be used to help promote adhesion at these adhesive bond interfaces. Adhesion promotion material may also be used to promote adhesion of adhesive 22 to the surface of support structure 12I.

Figure 4:
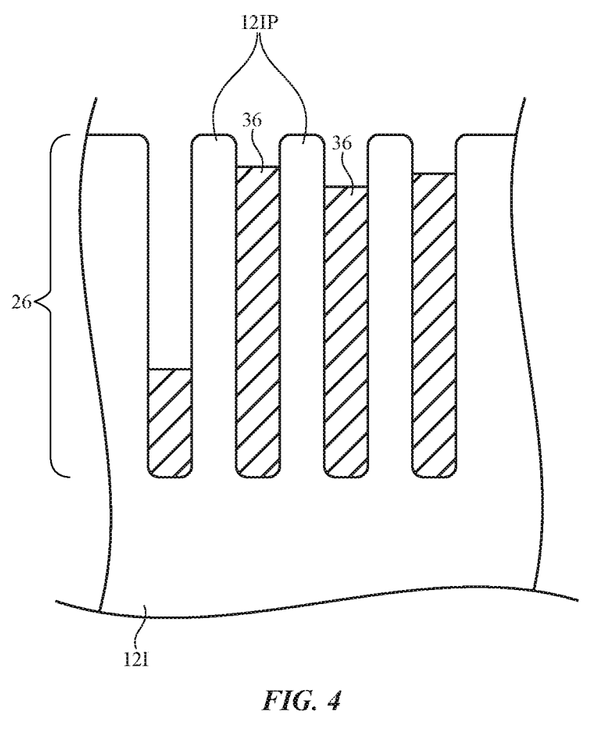
FIG. 4 is a cross-sectional side view of an illustrative anodized coating on a support structure in accordance with an embodiment.

A cross-sectional side view of support structure 12I showing how the surface of structure 12I may have a black anodized coating layer (e.g., layer 26). As shown in FIG. 4, support structure 24I may be formed from a metal member (e.g., a supporting member formed from aluminum) that is anodized to form adjacent pillars 12IP (e.g., pillars or other protrusions of aluminum oxide). Material 36 (e.g., black dye and/or other light-absorbing material) may be formed in the recesses between adjacent pillars 12IP to form a dark light-absorbing coating layer on the outer surface of support structure 24I to help suppress stray light reflections. If desired, electrodeposition techniques may be used to incorporate tin (Sn) and/or nickel (Ni) into the gaps between adjacent pillars. A black anodized coating (layer 26) that includes tin and nickel may help absorb near-infrared light emitted by a gaze tracking system in addition to visible stray light.

An optional chemical etch (e.g., a treatment in phosphoric acid—$H_3PO_4$) may be applied to microtexture the surface of support structure 12I. Microtexturing and black anodization (e.g., using a treatment that contains Sn and Ni) may help create a coating such as a black coating that exhibits low reflectance in the near infrared wavelengths that may be used by a gaze tracking system (see, e.g., components 16G of FIG. 2). Regardless of the technique used to form the black anodized coating or to otherwise treat the surface of support structure 12I prior to adhesive bond formation, optional adhesion promotion material may be coated over layer 26 (e.g., primer) to enhance the strength of the bond between adhesive 22 and structure 12I.

Figure 5:
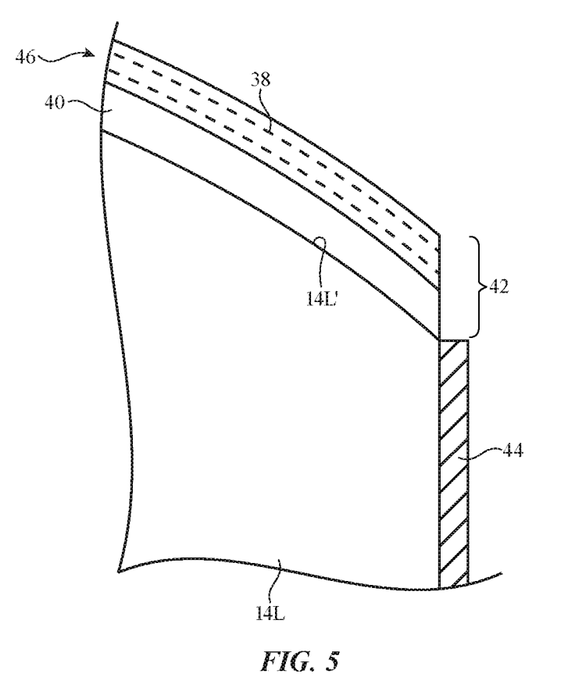
FIG. 5 is a cross-sectional side view of a portion of an illustrative lens in accordance with an embodiment.

FIG. 5 is a cross-sectional side view of a portion of lens 14L showing how surface 14L' of lens 14L may have one or more coatings 42. In the example of FIG. 5, lens 14L is formed from a material such as polymer (e.g., transparent acrylic) and is coated with hard coat layer 40 (e.g., a wet coated polymeric dielectric or other dielectric). Partial mirror coating 46 may be formed on layer 40. Layer 46 may be configured to form a half mirror (e.g., a mirror with about 50% reflectivity and 50% transmission) or other partial mirror that exhibits both partial reflection (e.g., reflection of 10-90%) and partial transmission (e.g., transmission of 10-90%) at visible wavelengths. Layer 46 may be formed from a metal thin-film coating or may be formed from a thin-film interference filter having multiple thin-film dielectric layers 38 (e.g., dielectric layers of alternating higher and lower refractive indices). The thin-film dielectric layers of layer 46 may be, for example, titanium oxide layers and silicon oxide layers. The innermost dielectric layer 38 may be silicon oxide and the outermost dielectric layer 38 may be silicon oxide (as an example). In this type of arrangement, the interface between coating 42 and adhesive 22 may be a silicon-oxide-to-adhesive bond. The side surface may be coated with opaque coating layer 44 (e.g., a layer of opaque polymer such as black polymer containing black dye and/or black pigment, a physical vapor deposition coating, and/or other opaque side surface coating layer configured to absorb visible and, if desired, near infrared light).

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). a person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
   a display;
   a lens through which the display is visible from an eye box, wherein the lens has an optical surface and a non-optical side surface, and the optical surface is covered with a thin-film interference filter;

a head-mounted support structure configured to support the display, wherein the head-mounted support structure has a support member configured to support the lens, wherein the support member has a first portion separated from the optical surface by a first gap and has a second portion separated from the non-optical side surface by a second gap; and adhesive having a first portion in the first gap and a second portion in the second gap, wherein the first portion bonds to the thin-film interference filter.

2. The head-mounted device defined in claim 1 wherein the support member comprises an aluminum member with a black anodized coating.

3. The head-mounted device defined in claim 1 wherein the non-optical side surface has an opaque coating layer interposed between the non-optical side surface and the second portion.

4. The head-mounted device defined in claim 1 wherein the second gap is larger than the first gap.

5. The head-mounted device defined in claim 1 wherein the adhesive comprises epoxy.

6. The head-mounted device defined in claim 1 wherein the adhesive comprises a non-silicone adhesive.

7. The head-mounted device defined in claim 1 wherein the adhesive comprises a material selected from the group consisting of: epoxy, urethane, and silane-modified polymer.

8. The head-mounted device defined in claim 1 wherein the adhesive has a Young's modulus of elasticity of 1 MPa to 200 MPa.

9. The head-mounted device defined in claim 1 wherein the optical surface has a partial mirror coating.

10. The head-mounted device defined in claim 1 wherein the support member comprises metal.

11. The head-mounted device defined in claim 1 wherein the optical surface is characterized by a first surface normal, wherein the non-optical side surface is characterized by a second surface normal, and wherein the first and second surface normals are oriented with respect to each other at an angle of 50-90°.

12. The head-mounted device defined in claim 1 further comprising a gaze tracking system configured to emit infrared light, wherein the support member has a surface configured to absorb visible light and configured to absorb the emitted infrared light.

13. The head-mounted device defined in claim 1 wherein the support member comprises aluminum having an anodized surface containing tin and nickel.

14. The head-mounted device defined in claim 1 further comprising a primer layer between the support member and the adhesive.

15. The head-mounted device defined in claim 1 wherein the support member has a channel formed by a three-axis milling machine and wherein the adhesive is received within the channel.

16. A head-mounted device, comprising:

a display;

a lens through which the display is visible from an eye box, wherein the lens has an optical surface and a non-optical side surface;

a head-mounted support structure configured to support the display and the lens;

a non-silicone adhesive configured to attach a portion of the optical surface of the lens to the head-mounted support structure; and an adhesion promotion layer between the portion of the optical surface of the lens and the non-silicone adhesive, wherein the non-silicone adhesive is coupled to the adhesion promotion layer.

17. The head-mounted device defined in claim 16 wherein the non-silicone adhesive has a Young's modulus of elasticity of 1-200 MPa.

18. The head-mounted device defined in claim 17 wherein the head-mounted support structure has a lens barrel formed from black anodized aluminum, wherein the non-silicone adhesive has a first portion that bonds the optical surface to the black anodized aluminum and a second portion that bonds the non-optical side surface to the black anodized aluminum.

19. A head-mounted device, comprising:

a display;

a lens through which the display is visible from an eye box, wherein the lens has an optical surface and a non-optical side surface;

a head-mounted support structure configured to support the display and the lens;

a visible-light-absorbing layer on the non-optical side surface; and adhesive configured to attach the lens to the head-mounted support structure, wherein the adhesive is coupled to the visible-light-absorbing layer, the adhesive is characterized by a first interface between the adhesive and the head-mounted support structure and a second interface between the adhesive and the lens, and the adhesive is configured to fracture in bulk in response to a drop event rather than failing at the first interface or the second interface.

* * * * *